(No Model.)
G. P. PILLING.
SKEWER PULLER.
No. 507,450.        Patented Oct. 24, 1893.
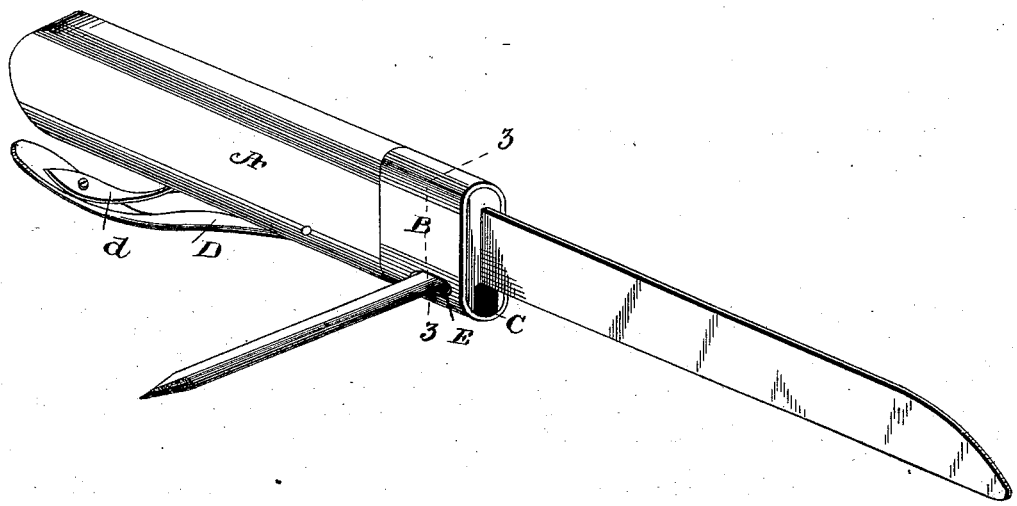
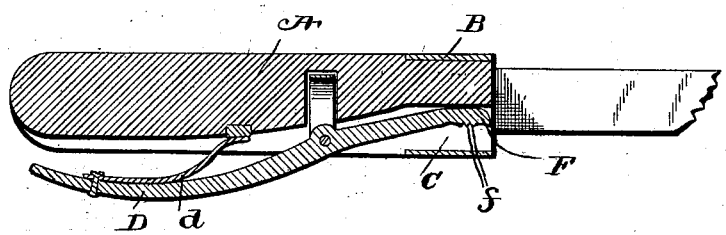
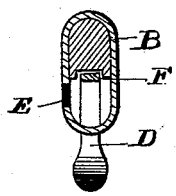
Witnesses
Inventor
G. P. Pilling
By John Wedderburn
Attorney

UNITED STATES PATENT OFFICE.

GEORGE P. PILLING, OF PHILADELPHIA, PENNSYLVANIA.

SKEWER-PULLER.

SPECIFICATION forming part of Letters Patent No. 507,450, dated October 24, 1893.

Application filed May 3, 1893. Serial No. 472,849. (No model.)

*To all whom it may concern:*

Be it known that I, GEORGE P. PILLING, of Philadelphia, in the county of Philadelphia and State of Pennsylvania, have invented certain new and useful Improvements in Skewer-Pullers; and I do hereby declare the following to be a full, clear, and exact description of the invention, such as will enable others skilled in the art to which it appertains to make and use the same.

This invention is an improved skewer puller; and is adapted for use upon knives, forks, and steels.

The object of the invention is to provide a strong and efficient puller which may be applied to the handle of a knife, fork, or steel, without marring its beauty or destroying its functions as such.

My invention consists in forming the ferrule of the handle with an opening, and pivoting a lever within the handle, the hole being intended to receive the skewer, and the lever to grip or hold the same, while being pulled.

My invention consists also in certain details of construction and combination of parts, all of which will be fully described and claimed.

In the drawings forming a part of this specification, Figure 1, is a perspective view of my improved puller, the skewer being shown held thereby. Fig. 2, is a longitudinal section of the same, and Fig. 3, is a section on the line 3—3 of Fig. 1.

Referring to the drawings, A, indicates the handle of a knife, fork, or sharpening steel, and my invention is usually applied to carving knives. I have so shown it in the accompanying drawings. This handle A, may be of any desirable material, and at the union of the blade and handle is secured a ferrule B.

The under face of the blade is also recessed, as shown at C, said recess extending into the ferrule B. Within the recess C, is pivoted a lever D, said lever being provided with a spring $d$, which tends to throw the rear end of lever away from the handle. The ferrule has an opening E, in one of the sides to receive the end of the skewer to be pulled, and upon the forward end of the lever D, opposite said opening is formed a head F, having teeth $f$ to bite into the skewer, and hold fast to the same.

The knife, fork, or steel, can be used in the usual manner whenever it is desired, and when it is desired to draw a skewer, the exposed end of this skewer is passed into the opening in the ferrule. The lever is then pressed to the handle, and the head with its teeth forced down upon the skewer. With this grip, the handle is then pulled away from the meat and the skewer withdrawn.

Having thus described my invention, what I claim is—

In a skewer puller, the combination of a handle having a recess in the under side thereof, a ferrule on said handle having an opening therein communicating with the said recess, and a spring actuated lever having a toothed head, said head being located in said recess and in line with the opening in the ferrule, substantially as described.

In testimony whereof I have signed this specification in the presence of two subscribing witnesses.

GEORGE P. PILLING.

Witnesses:
H. M. ALBERTSON,
W. D. QUIG.